March 22, 1960
R. W. KROGER
2,929,937
HYDRO-MOTOR
Filed Nov. 18, 1958
2 Sheets-Sheet 1
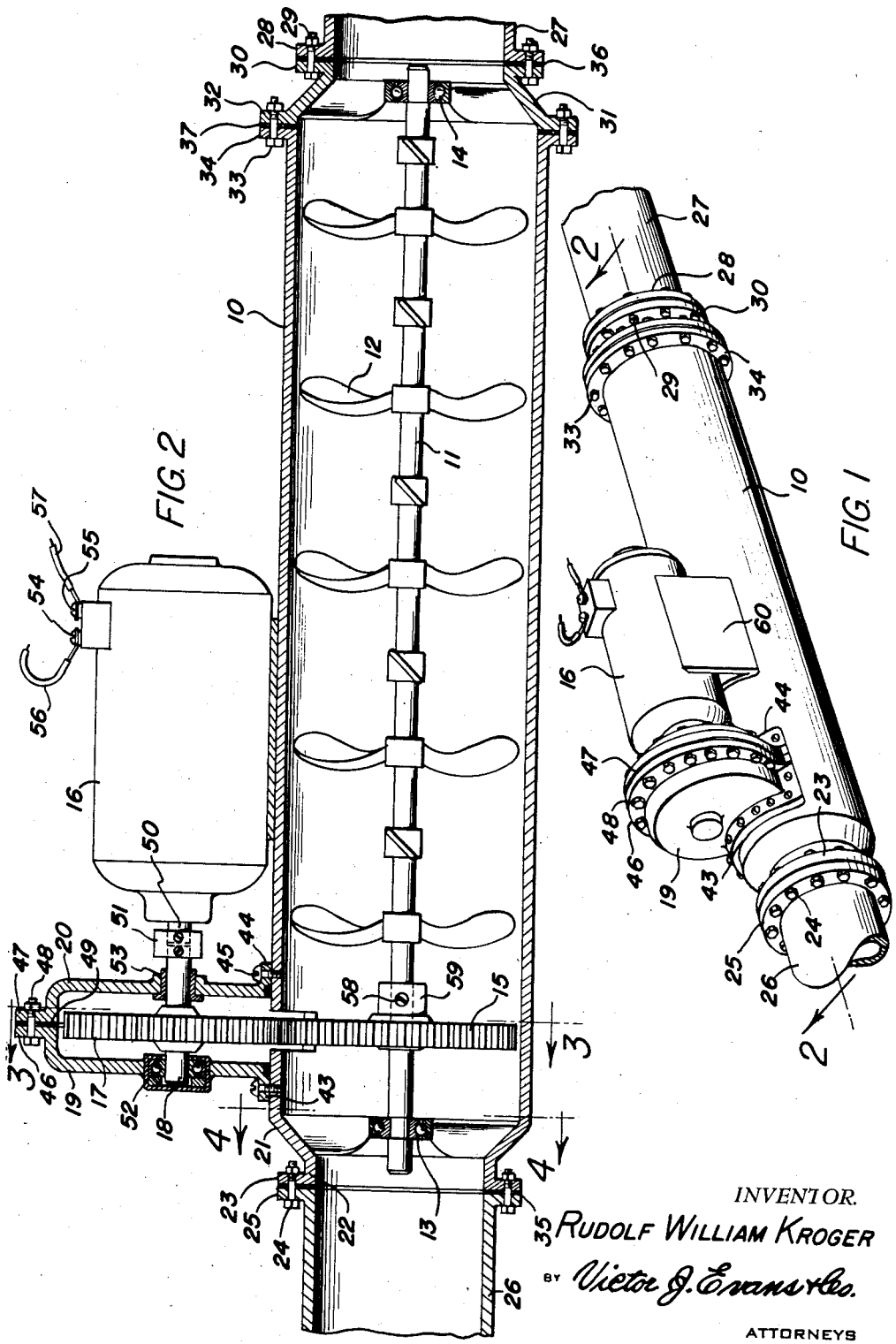
INVENTOR.
RUDOLF WILLIAM KROGER
BY Victor J. Evans & Co.
ATTORNEYS March 22, 1960

R. W. KROGER 2,929,937

HYDRO-MOTOR

Filed Nov. 18, 1958

INVENTOR.
RUDOLF WILLIAM KROGER
BY Victor J. Evans & Co.
ATTORNEYS

United States Patent Office 2,929,937
Patented Mar. 22, 1960

2,929,937

HYDRO-MOTOR

Rudolf William Kroger, Camp Douglas, Wis.

Application November 18, 1958, Serial No. 774,647

4 Claims. (Cl. 290—52)

This invention relates to power units or plants particularly of the type using power not otherwise used, and in particular a generator mounted in combination with a pipe line through which water, oil, or other fluid passes wherein a gear mounted on the shaft of the generator meshes with a gear on a shaft rotatably mounted in the pipe line and having propellers thereon so that the flow of water through the pipe line operates the generator through the gears thereby converting latent power or fluid passing through a pipe line into electrical energy.

The purpose of this invention is to provide a power unit capable of using latent power of fluid passing through a pipe line without retarding the flow of the fluid.

Various types of power units have been used in combination with pipe lines and particularly pipe lines for supplying water to residences, communities, cities, and the like, however, such devices restrict or interfere with the flow of water or other fluid and considerable power is lost between the propellers or other driving elements and a generator operated by the propelling elements. With this thought in mind this invention contemplates a tubular casing designed to be installed in a pipe line, the diameter of the casing being greater than that of the pipe line, a shaft rotatably mounted in the casing and having spaced propellers thereon, a gear mounted on the shaft and having spokes in the form of vanes such as the vanes of a propeller, and a generator having a gear thereon mounted with the gear positioned to mesh with the gear of the shaft.

The object of this invention is, therefore, to provide propelling means designed to be incorporated in a pipe line wherein fluid flowing through the pipe line operates a generator for developing electric power.

Another object of the invention is to provide means in a pipe line for driving a generator associated with the pipe line by fluid passing through the pipe line in which the operating elements do not restrict the flow of fluid through the pipe line.

A further object of the invention is to provide a power unit designed to be incorporated in a pipe line through which fluid flows whereby the flow of fluid through the pipe line generates electrical power in which the device is of a simple and economical construction.

With these and other objects and advantages in view the invention embodies an elongated tubular casing having reducing sections at the ends whereby the diameter of the casing is greater than that of the pipe line in which the device is installed, a shaft rotatably mounted in the casing, propellers mounted on the shaft, a gear also mounted on the shaft, a generator mounted on the casing, and a gear positioned on the shaft of the generator and mounted to mesh with the gear on the shaft rotatably mounted in the casing whereby the generator is actuated by the flow of fluid through the casing.

Other features and advantages of the invention will appear from the following description taken in connection with the drawings, wherein:

Figure 1 is a perspective view illustrating the installation of the power unit in a conventional pipe line.

Figure 2 is a longitudinal section through the power unit taken on line 2—2 of Figure 1 with the parts shown on an enlarged scale.

Figure 3:
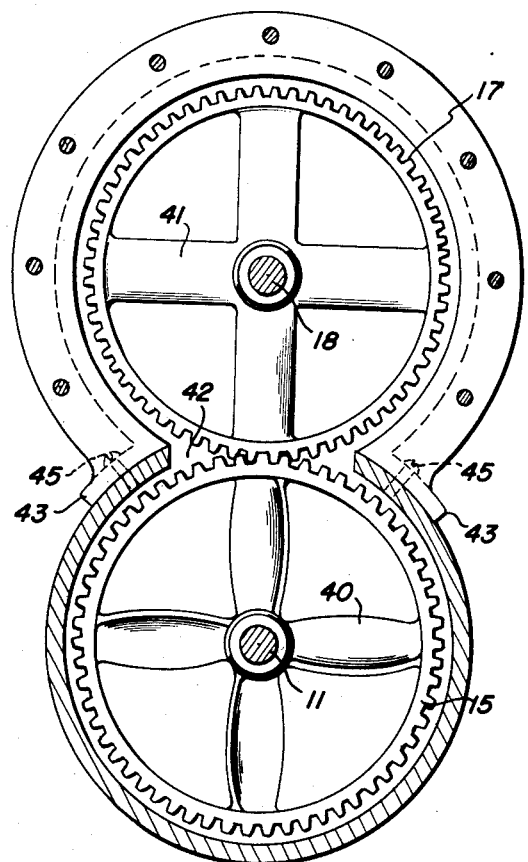
Figure 3 is a cross section through the power unit taken on line 3—3 of Figure 2 also with the parts shown on an enlarged scale and illustrating the gears by which the generator is operated by a propeller shaft in the pipe line.

Referring now to the drawings wherein like reference characters denote corresponding parts, the improved hydro-motor of this invention includes a cylindrical or tubular casing 10, a shaft 11 having propellers 12 thereon positioned in the casing and rotatably mounted therein by bearings 13 and 14, a gear 15 mounted on the shaft 11, a generator 16 which, in the design shown, is mounted on the casing 10, and a gear 17 mounted on a shaft 18 extended from the generator 16 and positioned in a housing including sections 19 and 20.

One end of the casing 10 is provided with a converging portion 21 which extends inwardly to a neck 22 and the neck is provided with a flange 23 that is secured by bolts 24 to a flange 25 on the end of a section 26 of a pipe line or the like. A similar section 27 of the pipe line is provided with a flange 28 that is secured by bolts 29 to a flange 30 on a reducing sleeve 31, the large end of the sleeve being provided with a flange 32 that is secured by bolts 33 to a flange 34 on the end of the casing 10.

A gasket 35 is provided between the flanges 23 and 25 at the end of the casing in which the gears are positioned, a similar gasket 36 is provided between the flanges 28 and 30, and a similar gasket 37 is provided between the flanges 32 and 34.

Figure 4:
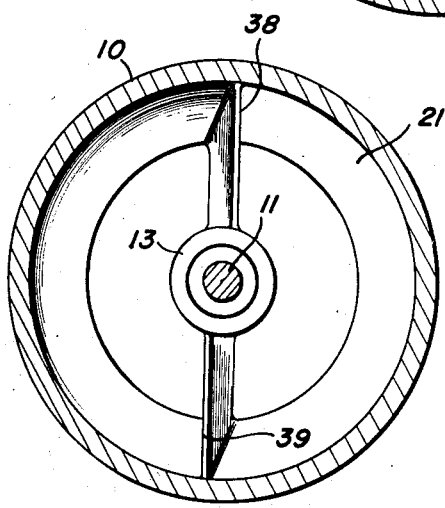
Figure 4 is a cross section through the unit taken on line 4—4 of Figure 2, also with the parts shown on an enlarged scale, showing vertically positioned arms for supporting bearings of the shaft in the ends of the casing of the power unit.

In the design shown the bearings 13 and 14 are positioned in the reducing or enlarging sections at the ends of the propeller casing and as illustrated in Figure 4 the bearings are supported by vertically disposed arms 38 and 39 which are streamlined, similar to propeller blades to permit free flow of water or other fluid through the unit.

The spokes or arms 40 of the gear 15 are also patterned to provide propeller blades so that the flow of fluid through the housing or casing of the unit rotates the gear which provides additional energy for rotating the shaft 11 and gear 17. The gear 17, which is provided with spokes 41 extends through an opening 42 in the casing 10 to mesh with the gear 15, as illustrated in Figure 3.

The sections 19 and 20 of the housing of the gear 17 are provided with flanges 43 and 44 by which the sections are secured to the casing 10 by screws 45. The sections 19 and 20 are also provided with flanges 46 and 47 through which bolts 48 extend for securing the sections together. A gasket 49 may be provided between the flanges 46 and 47.

The shaft 18 is secured to the generator shaft 50 by a coupling 51 and the shaft 18 is rotatably mounted in the sections 19 and 20 by bearings 52 and 53, respectively.

Terminals 54 and 55 of the generator are provided with leads 56 and 57 by which electricity may be carried to an electrical system or to storage means.

The propellers 12 may be secured to the shaft 11 by welding, or other suitable means and the gear 15 is secured to the shaft 11 by a set screw 58 that is positioned in a hub 59 extended from one side of the gear, as shown in Figure 2.

The bearings 13 and 14 may be provided with suitable casings whereby the bearings are protected from water or other fluid passing through the power unit.

With the casing 10 enlarged in reference to the pipe line in which it is installed the area of the pipe line is not reduced by the propellers, gear, bearings, or the like.

The generator 16 is illustrated as being mounted in a cradle 60 on the outer surface of the casing 10 and it will be understood that the generator may be mounted independently of the casing or located in any suitable position.

With the parts assembled, particularly as illustrated in Figure 2, and installed in a pipe line, such as including the sections 26 and 27 water flowing through the pipe line, either by gravity or as a result of being forced by a pump travels through the casing 10 applying its force directly upon the blades of the propellers and also upon the spokes or blades 40 of the gear 15, rotating the shaft 11 with the gear 15 and the gear actuates a generator 16 through the gear 17. By this means latent power in water passing through a pipe line is utilized without restricting the flow of the water and electric energy developed by the generator may be used for various purposes.

It will be understood that modifications, within the scope of the appended claims, may be made in the design and arrangement of the parts without departing from the spirit of the invention.

What is claimed is:

1. In a power unit, the combination which comprises an elongated casing, a pipe line having a gap therein, means for mounting the elongated casing in the gap of the pipe line, a shaft rotatably mounted in the elongated casing longitudinally thereof, a gear fixedly mounted on the shaft within the casing and extending transversely thereof, propellers fixedly mounted on the shaft and positioned in spaced relation, a generator mounted on the casing, a housing mounted on the casing and positioned at one end of the generator, a shaft extended from the generator and rotatably mounted in the housing, and a gear on the shaft rotatably mounted in the housing and positioned to mesh with the gear on the shaft rotatably mounted in the casing.

2. In a power unit, the combination which comprises an elongated casing, a pipe line having a gap therein, means for mounting the elongated casing in the gap of the pipe line, a shaft rotatably mounted in the elongated casing longitudinally thereof, a gear fixedly mounted on the shaft within the casing and extending transversely thereof, propellers fixedly mounted on the shaft and positioned in spaced relation, a generator mounted on the casing, a housing mounted on the casing and positioned at one end of the generator, a shaft extended from the generator and rotatably mounted in the housing, and a gear on the shaft rotatably mounted in the housing and positioned to mesh with the gear on the shaft rotatably mounted in the casing, the ends of the elongated casing having reducing means therein for connecting the elongated casing in a pipe line, the diameter of which is less than that of the elongated casing.

3. In a power unit, the combination which comprises an elongated cylindrical casing having reducing portions at the ends for connecting the casing in a pipe line, the diameter of which is less than that of the casing, a shaft rotatably mounted in the elongated casing, a gear on the shaft, a plurality of propellers positioned in spaced relation on the shaft, a generator mounted on the elongated casing, a shaft extended from the generator, a gear mounted on the shaft extended from the generator, and positioned to mesh with the gear on the shaft rotatably mounted in the elongated casing, the elongated casing having an opening in one side and a gear on the shaft extended from the generator being mounted to extend through the opening in the side of the casing whereby the gear on the shaft extended from the generator meshes with the gear on the shaft rotatably mounted in the elongated casing, and a housing positioned over the opening of the elongated casing and also enclosing the gear mounted on a shaft extended from the generator.

4. A power unit as described in claim 3 wherein the means for rotatably mounting the shaft in the elongated cylindrical casing includes bearings and wherein the bearings are supported from the elongated cylindrical casing by vertically disposed bars.

References Cited in the file of this patent

UNITED STATES PATENTS

| | | |
|---|---|---|
| 1,562,556 | Harza | Nov. 24, 1925 |
| 1,594,826 | Fairbank | Aug. 3, 1926 |
| 2,436,683 | Wood | Feb. 24, 1948 |
| 2,481,222 | Jones | Sept. 6, 1949 |
| 2,744,465 | Springer | May 8, 1956 |

FOREIGN PATENTS

| | | |
|---|---|---|
| 619,269 | France | Dec. 28, 1926 |